(12) United States Patent
Huang

(10) Patent No.: US 8,505,224 B2
(45) Date of Patent: Aug. 13, 2013

(54) FRAME STRUCTURE FOR SOLAR CELL MODULE

(75) Inventor: Ting-Hui Huang, Hsinchu (TW)

(73) Assignee: Hulk Energy Technology Co., Ltd., Miaoli County (TW)

( * ) Notice: Subject to any disclaimer, the term of this patent is extended or adjusted under 35 U.S.C. 154(b) by 30 days.

(21) Appl. No.: 13/351,765

(22) Filed: Jan. 17, 2012

(65) Prior Publication Data

US 2013/0134117 A1 May 30, 2013

(30) Foreign Application Priority Data

Nov. 25, 2011 (TW) .............................. 100222403 U

(51) Int. Cl.
*H01L 31/02* (2006.01)
*G09F 1/12* (2006.01)

(52) U.S. Cl.
USPC .............. 40/790; 40/782; 52/173.3; 126/704; D25/125

(58) Field of Classification Search
USPC .................. 40/782, 780, 783, 784, 785, 790, 40/658; D25/125; 52/173.3; 126/704
See application file for complete search history.

(56) References Cited

U.S. PATENT DOCUMENTS

| | | | | |
|---|---|---|---|---|
| 3,514,886 A | * | 6/1970 | Drakard | 40/766 |
| D243,674 S | * | 3/1977 | Dallaire | D25/124 |
| D244,500 S | * | 5/1977 | Copeland | D25/125 |
| 4,136,470 A | * | 1/1979 | Barz | 40/782 |
| D253,131 S | * | 10/1979 | Broadbent | D25/125 |
| 4,665,676 A | * | 5/1987 | Drzemala | 52/656.9 |
| 4,839,974 A | * | 6/1989 | Walter | 40/784 |
| 4,877,213 A | * | 10/1989 | Lambert | 248/451 |
| 5,515,629 A | * | 5/1996 | Johansson | 40/745 |
| 6,115,982 A | * | 9/2000 | Lindenberg | 52/506.05 |
| D451,955 S | * | 12/2001 | Hanagata | D19/30 |
| D459,975 S | * | 7/2002 | Dinh et al. | D8/354 |
| D641,101 S | * | 7/2011 | Radchenko et al. | D26/138 |
| 2010/0263724 A1 | | 10/2010 | Tazawa et al. | |

* cited by examiner

*Primary Examiner* — Casandra Davis
(74) *Attorney, Agent, or Firm* — WPAT, PC; Justin King

(57) ABSTRACT

A frame structure for solar cell module, in which each of the four sidebars that constructs the frame structure is comprised of a bottom, a first vertical wall, a second vertical wall, a first horizontal wall and a second horizontal wall. Substantially, the present invention provides a a frame structure constructed using parts of different curvatures, that is capable of preventing any filling material from overflowing on the front side of a solar cell element during the integration of the solar cell element and the front structure, without having the so-constructed solar cell module to be processed by an additional machining process for processing the overflowed filling material after the integration, and thus not only the sidebars of the frame structure can be prevented from being broken by the stress resulting from the machining process, but also the manufacturing time required for the consequent solar cell module can be reduced.

2 Claims, 5 Drawing Sheets

FRAME STRUCTURE FOR SOLAR CELL MODULE

FIELD OF THE INVENTION

The present invention relates to solar cell technology, and more particularly, to a frame for solar cell module.

BACKGROUND OF THE INVENTION

For a conventional solar cell module based on copper indium selenide (CIS), it is basically formed as a solar cell that is made by depositing a metallic back layer, a p-type absorber layer, a high-resistance buffer layer and a n-type window layer on a substrate. Moreover, after being sandwiched inside a weather-resistance film made of a filling material, such as ethylene vinyl acetate (EVA), the so-constructed solar cell is further being covered by a compactly fitted inside a glass housing while being framed by a frame structure that can be made of aluminum. Thereby, the solar cell module that is being framed inside the frame structure is capable of preventing the incursion of water and moisture into the glass housing and thus improving the weather resistance of the solar cell module.

Generally, while viewing a conventional CIS-based solar cell module, which is formed as a solar cell element sandwiched between a glass cover and a glass substrate and framed inside an aluminum frame structure while having an electrode assembly protruding outside the frame structure, only the aluminum frame structure, the electrode assembly and the solar cell element is clearly visible. In addition, in some cases, the aluminum frame structure is coated in a color the same as that of the solar cell element.

It is noted that there will be filling materials being filled into the aluminum frame structure before integrating the aluminum frame structure with the solar cell element, and thus, while fitting the solar cell element into the aluminum frame structure, the filling materials will be squeezed and thus overflowed out of the frame structure and onto the front and back of the solar cell element. Therefore, it is necessary to include an additional machining process into the manufacturing of the solar cell module for removing the filling material that is overflowed on the front of the solar cell element so as to ensure the solar cell module to operate normally.

There are already many studies for preventing the filling materials from overflowing. One of which is solar cell module disclosed in U.S. Pat. App. No. 2010/0263724A1, in which a structure composed of a spacer, a projected line and a guide groove is used for preventing the filling material to overflow on the front side of the solar cell element, but instead to be guided to flow into the guide groove.

Nevertheless, despite that the filling materials can be guided and thus prevented from flowing on the front of the solar cell element by the aforesaid technique, the overall labor and cost for manufacturing the solar cell module will be increased, since not only an additional machining process is required for processing the aluminum frame so as to formed the projected line and the guide groove, but also there is additional materials required for forming the spacers. Moreover, since there is a sharp gap formed between the upper tongue piece and the vertical wall corresponding thereto in the aforesaid solar cell module, the aluminum frame can easily be broken by reverse wind stress.

SUMMARY OF THE INVENTION

The primary object of the present invention is to provide a frame structure constructed using parts of different curvatures, that is capable of preventing any filling material from overflowing on the front side of a solar cell element during the integration of the solar cell element and the front structure, without having the so-constructed solar cell module to be processed by an additional machining process for processing the overflowed filling material after the integration, and thus not only the sidebars of the frame structure can be prevented from being broken by the stress resulting from the machining process, but also the manufacturing time required for the consequent solar cell module can be reduced.

To achieve the above object, the present invention provides a frame structure for solar cell module, which comprises: four sidebars and four corner connectors in a manner that any two neighboring sidebars are connected by one corner connector selected from the four corner connectors, and is characterized in that each of the four sidebars is comprised of a bottom, a first vertical wall, a second vertical wall, a first horizontal wall and a second horizontal wall in a manner that the first vertical wall is formed with a width larger than that of the second vertical wall, and the first vertical wall is connected to an end of the bottom by an end thereof while being arranged perpendicular to the bottom; the second vertical wall is connected to the bottom and is arranged perpendicular to the bottom while allowing the second vertical wall to be spaced from the first vertical wall by a specific first distance; the second horizontal wall is connected to an end of the first vertical wall that is disposed away from the bottom while being arranged perpendicular to the first vertical wall; the first horizontal wall is perpendicularly connected to the first vertical wall and is spaced from the second horizontal wall by a specific second distance while being arranged abutting against an end of the second vertical wall that is disposed away from the bottom; the first horizontal wall is projectedly formed with a sixth curvature part at a side thereof that is arranged away from the first vertical wall and facing toward the second horizontal wall, and also is indentedly formed with a fifth curvature part at a side thereof that is arranged proximate to the first vertical wall and facing toward the second horizontal wall; the second horizontal wall is projected formed with a first curvature part at a side thereof that is arranged away from the first vertical wall and facing toward the first horizontal wall, and also is indented formed with a second curvature part at a side thereof that is arranged proximate to the first vertical wall and facing toward the first horizontal wall; the first vertical wall further is indentedly formed with a third curvature part at a side thereof that is disposed neighboring to the second horizontal wall and sandwiched between the first and the second horizontal walls, and also is formed with at least two fourth curvature parts that are projectedly formed and at least one fourth curvature part that is indentedly formed on the same side of the third curvature part. In an embodiment of the invention, each of the at least two projectedly formed fourth curvature parts is formed with a curvature the same as that of each of the at least one indentedly formed fourth curvature part, while allowing each of the at least one indentedly formed fourth curvature part to be arranged at a position surrounding by the at least two projectedly formed fourth curvature parts; and further the second and the fifth curvature parts are arranged connecting respectively to the third curvature part and the at least two projectedly formed fourth curvature parts that are formed neighboring thereto on the first vertical wall.

In another embodiment of the present invention, the second curvature part is formed with a plurality of wedge-shaped teeth on a side surface thereof facing toward the first horizontal wall, and each of the plural wedge-shaped teeth is arranged in a manner that the center of each wedge-shaped tooth 26 is placed on the line defined by the curvature of the second curvature part while being orientated toward the first vertical wall.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
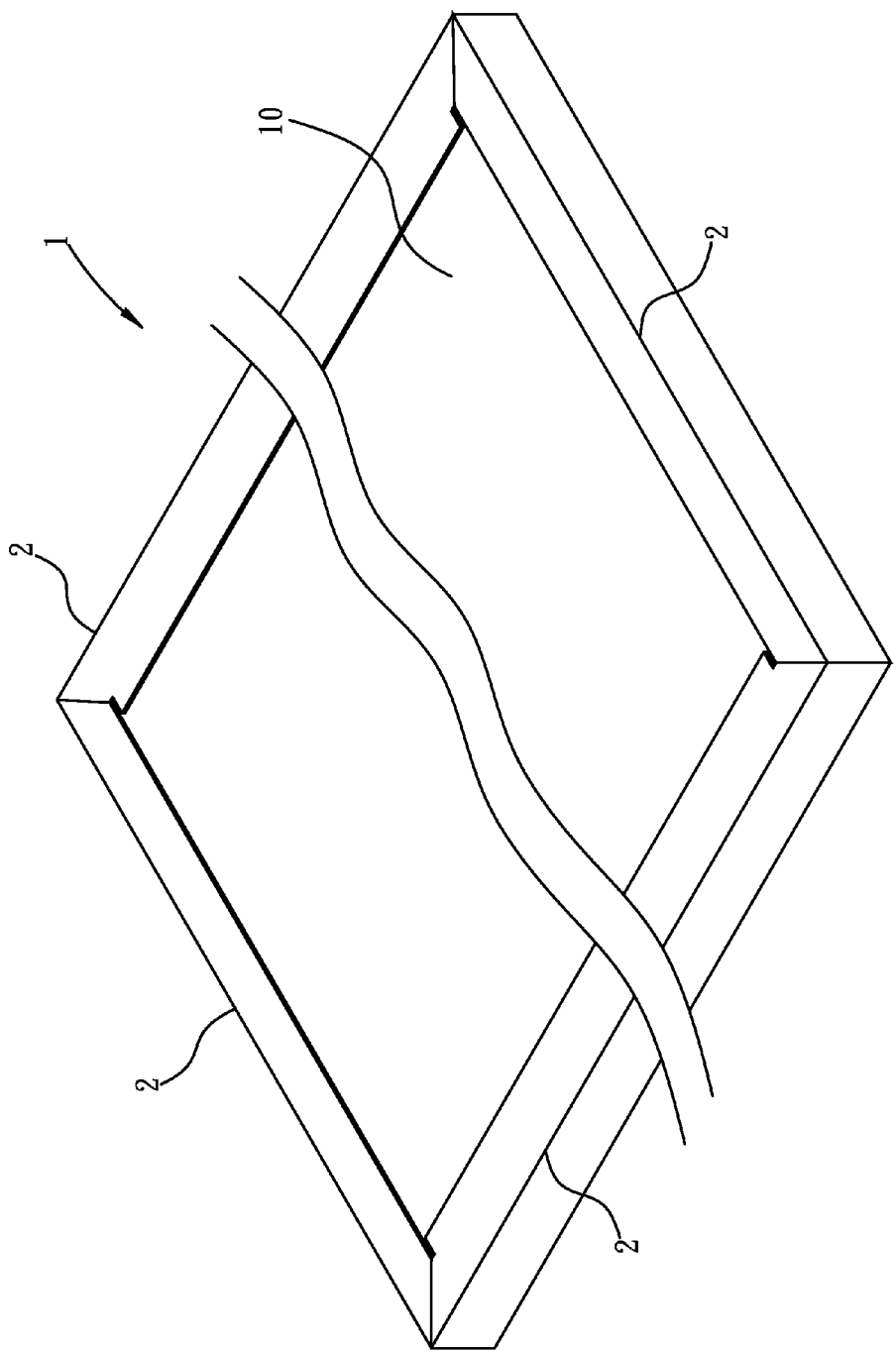
FIG. 1 is a schematic diagram showing a frame structure for solar cell module according to the present invention.
Figure 2:
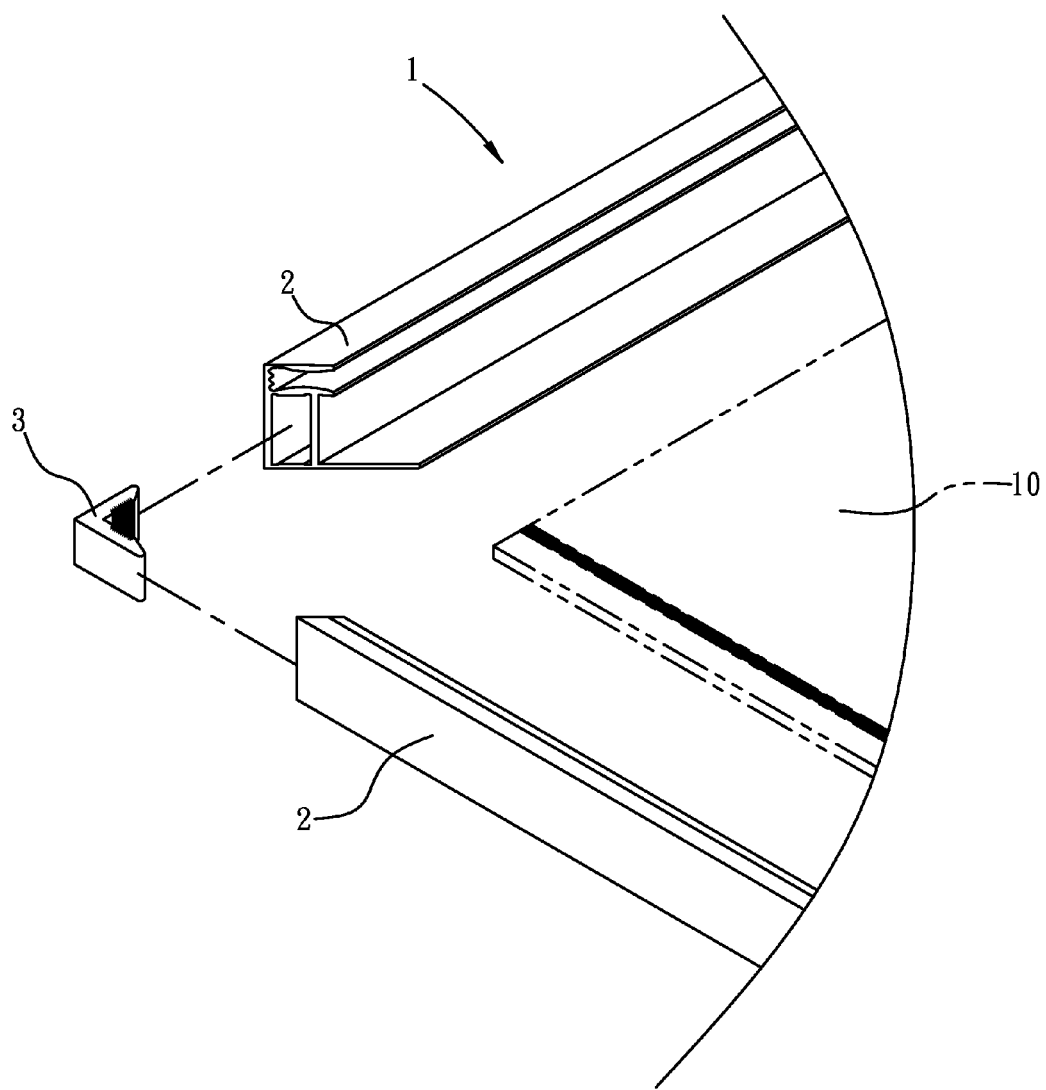
FIG. 2 is an exploded view of frame structure for solar cell module according to the present invention.
Figure 3:
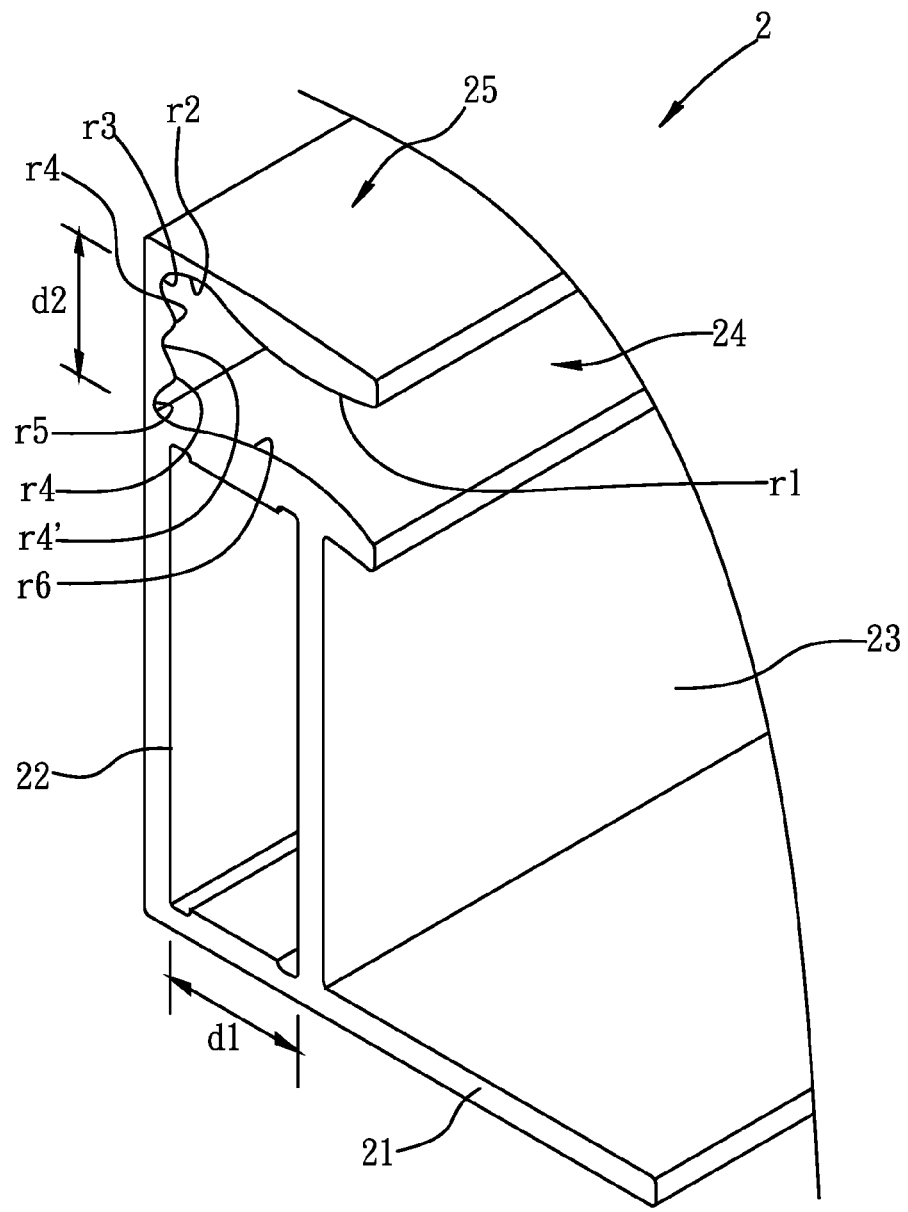
FIG. 3 is a three-dimensional view showing a cross section of a sidebar used in a frame structure for solar cell module according to a first embodiment of the invention.
Figure 4:
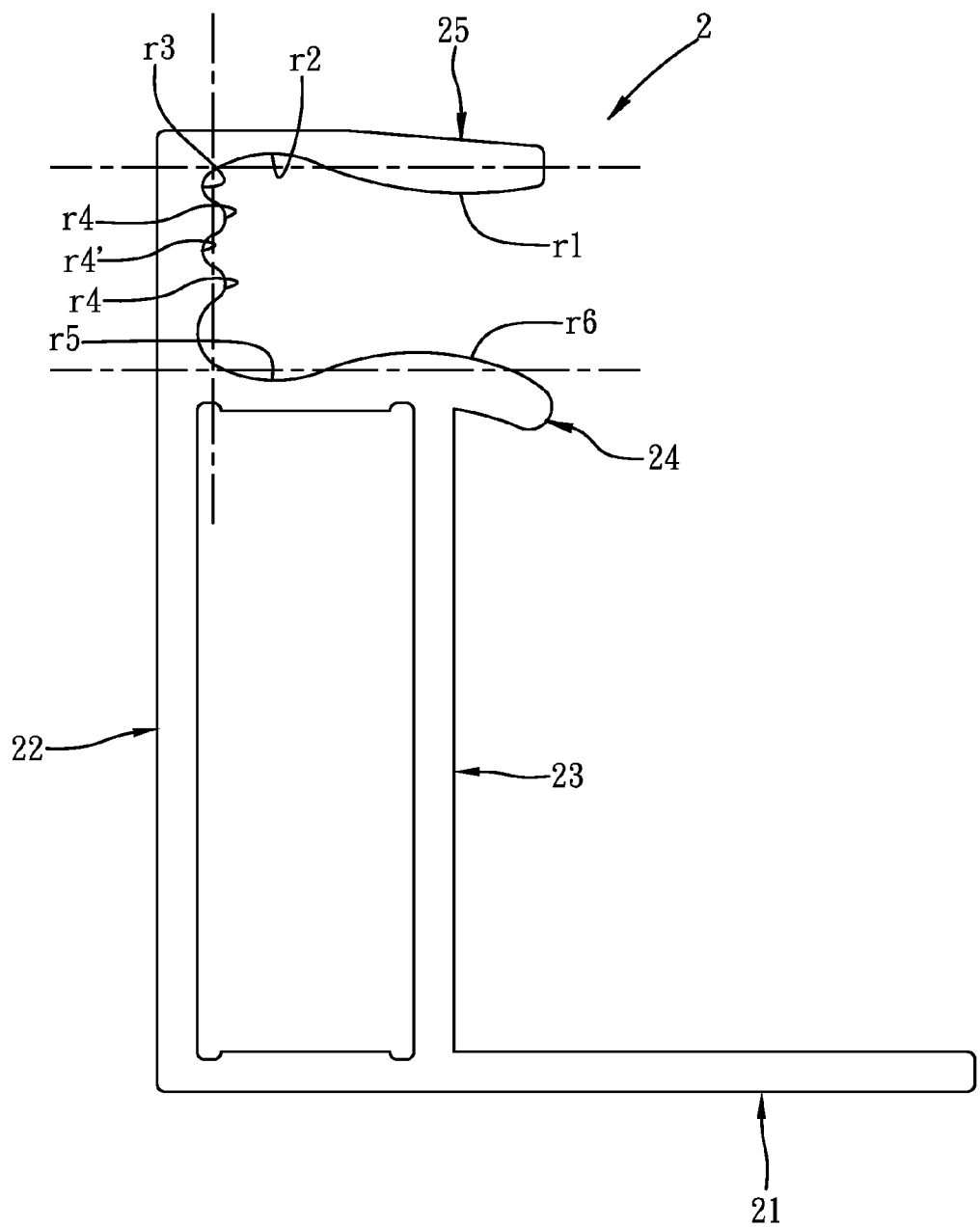
FIG. 4 is a side view showing a cross section of a sidebar used in a frame structure for solar cell module according to the first embodiment of the invention.
Figure 5:
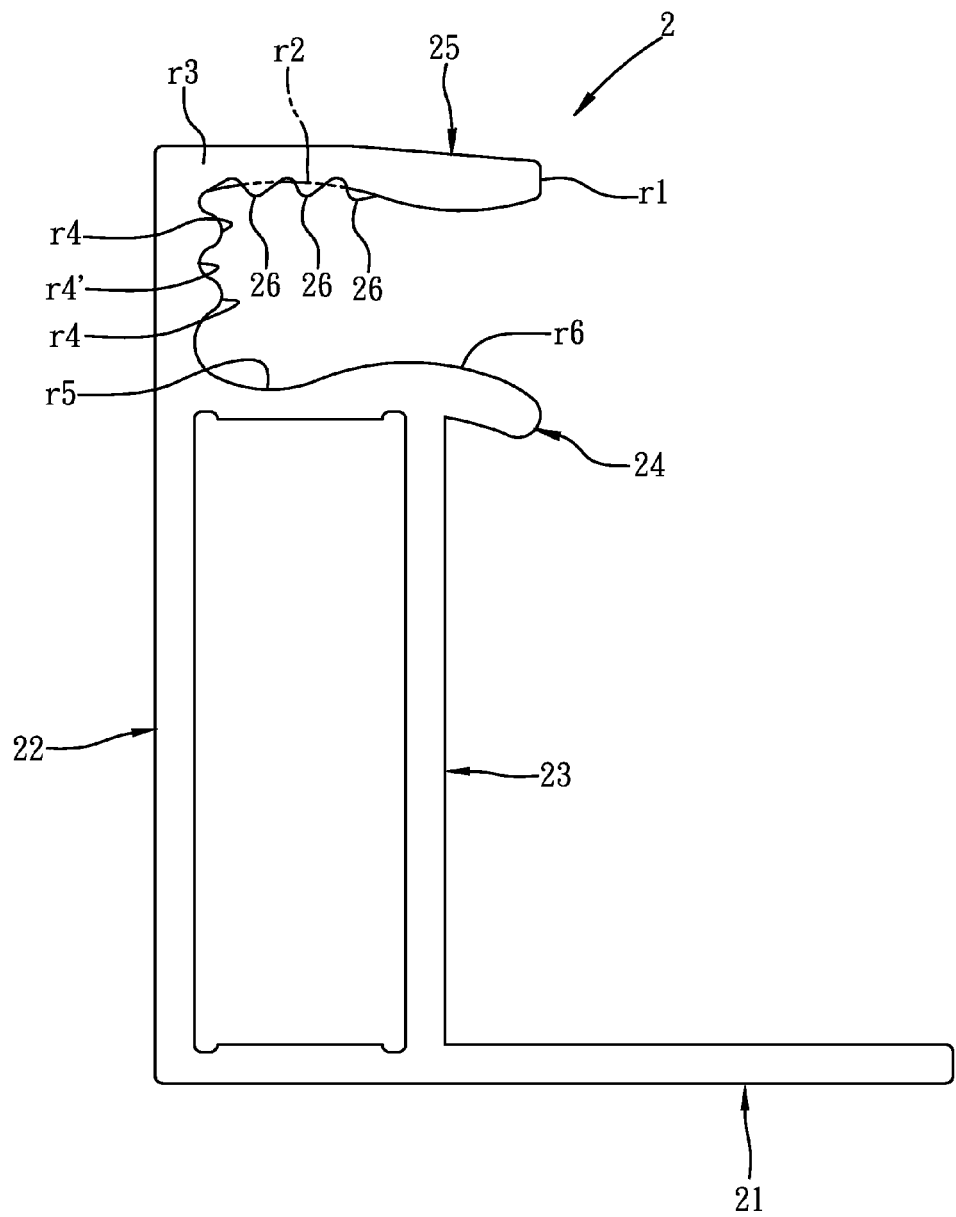
FIG. 5 is a three-dimensional view showing a cross section of a sidebar used in a frame structure for solar cell module according to a second embodiment of the invention.

Please refer to FIG. 1 to FIG. 5, in which FIG. 1 is a schematic diagram showing a frame structure for solar cell module according to the present invention; FIG. 2 is an exploded view of frame structure for solar cell module according to the present invention; FIG. 3 is a three-dimensional view showing a cross section of a sidebar used in a frame structure for solar cell module according to a first embodiment of the invention; FIG. 4 is a side view showing a cross section of a sidebar used in a frame structure for solar cell module according to the first embodiment of the invention; and FIG. 5 is a three-dimensional view showing a cross section of a sidebar used in a frame structure for solar cell module according to a second embodiment of the invention.

The frame structure 1 for solar cell module is composed of four sidebars 2 and four corner connectors 3, in which the four sidebars 2 are constructed almost the same but are only different in length for allowing the assembly of the four sidebars 2 to conform to the size of the solar cell element 10. For instance, if the frame structure is designed for framing a rectangle-shaped solar cell element, the top and bottom sidebars should be formed in a length shorter that of the left and right sidebars. Moreover, each of the four corner connecters 3 is disposed between any two neighboring sidebars 2 for connecting the two, as shown in FIG. 1 and FIG. 2.

In an embodiment of the invention, each of the four sidebars 2 is comprised of a bottom 21, a first vertical wall 22, a second vertical wall 23, a first horizontal wall 24 and a second horizontal wall 25 in a manner that the first vertical wall 22 is formed with a width larger than that of the second vertical wall 23, and the first vertical wall 22 is connected to an end of the bottom 21 by an end thereof while being arranged perpendicular to the bottom 21; the second vertical wall 23 is perpendicularly connected to the bottom 21 while allowing the second vertical wall 23 to be spaced from the first vertical wall 22 by a specific first distance d1; the second horizontal wall 25 is connected to an end of the first vertical wall 22 that is disposed away from the bottom 21 while being arranged perpendicular to the first vertical wall 22; the first horizontal wall 24 is perpendicularly connected to the first vertical wall 22 and is spaced from the second horizontal wall 25 by a specific second distance d2 while being arranged abutting against an end of the second vertical wall 23 that is disposed away from the bottom 21.

Moreover, the first horizontal wall 24 is projectedly formed with a sixth curvature part r6 at a side thereof that is arranged away from the first vertical wall 22 and facing toward the second horizontal wall 25, and also is indentedly formed with a fifth curvature part r5 at a side thereof that is arranged proximate to the first vertical wall 22 and facing toward the second horizontal wall 25; the second horizontal wall 25 is projected formed with a first curvature part r1 at a side thereof that is arranged away from the first vertical wall 22 and facing toward the first horizontal wall 24, and also is indented formed with a second curvature part r2 at a side thereof that is arranged proximate to the first vertical wall 22 and facing toward the first horizontal wall 24; the first vertical wall 22 further is indentedly formed with a third curvature part r3 at a side thereof that is disposed neighboring to the second horizontal wall 25 and sandwiched between the first and the second horizontal walls 24, 25, and also is formed with at least two fourth curvature parts r4 that are projectedly formed and at least one fourth curvature part r4' that is indentedly formed on the same side of the third curvature part r3. In this embodiment, there are two projectedly formed fourth curvatures r4 and one indentedly formed fourth curvature part r4', but the amount of such fourth curvature parts r4, r4' is not limited thereby. In addition, each of the at least two projectedly formed fourth curvature parts r4 is formed with a curvature the same as that of each of the at least one indentedly formed fourth curvature part r4', and each of the at least one indentedly formed fourth curvature part r4' is arranged at a position surrounding by the at least two projectedly formed fourth curvature parts r4; and further the second and the fifth curvature parts r2, r5 are arranged connecting respectively to the third curvature part r3 and one of the at least two projectedly formed fourth curvature parts r4 that are formed neighboring thereto on the first vertical wall, as shown in FIG. 3 and FIG. 4.

Before integrating the solar cell element 10 with the sidebars 2, the gap formed between the first and the second horizontal walls 24, 25 will first be filled with a filling material without having the filling material to be restricted in any way. Thereafter, while insetting the solar cell element 10 into the gap formed between the first and the second horizontal walls 24, 25 in a condition that the assembly of the solar cell element 10 and the sidebars 2 is placed upside down, the solar cell element 10 will be pushed to press tightly against the first curvature part r1 on the second horizontal wall 25, resulting that the filling material will be squeezed by the inserting of the solar cell element 10 while the solar cell element 10 is clamped between the first curvature part r1 and the sixth curvature part r6, and consequently, due the squeezing and insetting of the solar cell element 10, the filling material will overflow and thus move to a position surrounded between the second curvature part r2, the third curvature part r3, the projectedly formed fourth curvature parts r4, and the indentedly formed fourth curvature part r4'. Nevertheless, during the overflowing of the filling material 4, the flowing of the overflowed fill material will be damped and slowed down by the rugged surface composed of the projectedly formed fourth curvature parts r4 and the indentedly formed fourth curvature part r4', while allowing the third curvature part r3 to be used as an accommodation space for storing a portion of the filling material that is overflowed and flowing toward the second horizontal wall 25.

If there are sill filling material that is flowing passing the third curvature part r3 and continue toward the first curvature part r1, by the restriction of the second curvature part r2, there will less and less space formed between the first curvature part r1 and the solar cell element 10 that can allow the filling material to overflow, and thus the flowing of the overflowed filling material is further being damped for preventing the filling material to flow out of the range that is defined within the width of the second horizontal wall 25. Simultaneously, there will be a portion of the overflowed filling material that is to be forced to flow toward the sixth curvature part r6, and since the assembly of the solar cell element 10 and the sidebars 2 is placed upside down, comparatively there will be more space formed between the sixth curvature part r6 and the solar cell element 10 that is available for the filling material to overflow. Moreover, since the surface composed of the fifth curvature part r5 and the sixth curvature part r6 is a smooth surface, the overflowed filling material will not be damped in any way and thus can flow smoothly out of the sixth curvature part r6 and onto the back of the solar cell element 10. However, those filling material that is attached onto the back of the solar cell element 10 is blocked by the bottom 21 and can not be seen from the front, so that not only the function and reliability of the resulting solar cell module will not be adversely affected, but also the appearance of the resulting solar cell module will still be presentable.

In addition, on each sidebar 2, the connection between the first horizontal wall 24 and the first vertical wall 2 is achieved by connecting the fifth curvature part r5 to its neighboring projectedly formed fourth curvature part r4, and also the connection between the second horizontal wall 25 and the first vertical wall 2 is achieved by connecting the second curvature part r2 to the third curvature part r3. Thereby, the flexibility of the frame structure of the present invention is improved for preventing the same to be easily broken by reverse wind stress.

In another embodiment of the invention, on each sidebar 2, the second curvature part r2 is further formed with a plurality of wedge-shaped teeth 26 on a side surface thereof facing toward the first horizontal wall 24, and each of the plural wedge-shaped teeth 26 is arranged in a manner that the center of each wedge-shaped tooth 26 is placed on the line the curvature of the second curvature part r2 while being orientated toward the first vertical wall 22. Thus, while integrating the solar cell element 10 to the sidebars 2, the filling material will be squeezed by the insetting of the solar cell element 10 while the solar cell element 10 is clamped between the first curvature part r1 and the sixth curvature part r6, and consequently, due the squeezing and insetting of the solar cell element 10, the filling material will overflow and thus move to a position surrounded between the second curvature part r2, the third curvature part r3, the projectedly formed fourth curvature parts r4, and the indentedly formed fourth curvature part r4'. Nevertheless, during the overflowing of the filling material 4, the flowing of the overflowed fill material will be damped and slowed down by the rugged surface composed of the projectedly formed fourth curvature parts r4 and the indentedly formed fourth curvature part r4', while allowing the third curvature part r3 to be used as an accommodation space for storing a portion of the filling material that is overflowed and flowing toward the second horizontal wall 25. Nevertheless, if there are sill filling material that is flowing passing the third curvature part r3 and continue toward the first curvature part r1, by the operation of the plural wedge-shaped teeth 26 formed on the second curvature part r2, the damping to the filling material that is overflowed toward the second horizontal wall 25 will be larger than the damping to those flowing toward the first horizontal wall 24, i.e. the flowing speed of the overflowed filling material that is flowing toward the second horizontal wall 25 will be slower than those flowing toward the first horizontal wall 24. Consequently, it is easily to force the overflowed filling material to flow toward the sixth curvature part r6 and onto the back of the solar cell element 10. However, those filling material that is attached onto the back of the solar cell element 10 is blocked by the bottom 21 and can not be seen from the front, so that not only the function and reliability of the resulting solar cell module will not be adversely affected, but also the appearance of the resulting solar cell module will still be presentable.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A frame structure for solar cell module, comprising: four sidebars and four corner connectors in a manner that any two neighboring sidebars are connected by one corner connector selected from the four corner connectors, and is characterized in that each of the four sidebars is comprised of a bottom, a first vertical wall, a second vertical wall, a first horizontal wall and a second horizontal wall in a manner that the first vertical wall is formed with a width larger than that of the second vertical wall, and the first vertical wall is connected to an end of the bottom by an end thereof while being arranged perpendicular to the bottom; the second vertical wall is connected to the bottom and is arranged perpendicular to the bottom while allowing the second vertical wall to be spaced from the first vertical wall by a specific first distance; the second horizontal wall is connected to an end of the first vertical wall that is disposed away from the bottom while being arranged perpendicular to the first vertical wall; the first horizontal wall is perpendicularly connected to the first vertical wall and is spaced from the second horizontal wall by a specific second distance while being arranged abutting against an end of the second vertical wall that is disposed away from the bottom; the first horizontal wall is projectly formed with a sixth curvature part at a side thereof that is arranged away from the first vertical wall and facing toward the second horizontal wall, and also is indentedly formed with a fifth curvature part at a side thereof that is arranged proximate to the first vertical wall and facing toward the second horizontal wall; the second horizontal wall is projected formed with a first curvature part at a side thereof that is arranged away from the first vertical wall and facing toward the first horizontal wall, and also is indented formed with a second curvature part at a side thereof that is arranged proximate to the first vertical wall and facing toward the first horizontal wall; the first vertical wall further is indentedly formed with a third curvature part at a side thereof that is disposed neighboring to the second horizontal wall and sandwiched between the first and the second horizontal walls, and also is formed with at least two fourth curvature parts that are projectedly formed and at least one fourth curvature part that is indentedly formed on the same side of the third curvature part; wherein, each of the at least two projectedly formed fourth curvature parts is formed with a curvature the same as that of each of the at least one indentedly formed fourth curvature part, while allowing each of the at least one indentedly formed fourth curvature part to be arranged at a position surrounding by the at least two projectedly formed fourth curvature parts; and further the second and the fifth curvature parts are arranged connecting respectively to the third curvature part and the at least two projectedly formed fourth curvature parts that are formed neighboring thereto on the first vertical wall.

2. The frame structure for solar cell module of claim 1, wherein the second curvature part is formed with a plurality of wedge-shaped teeth on a side surface thereof facing toward the first horizontal wall, and each of the plural wedge-shaped teeth is arranged in a manner that the center of each wedge-shaped tooth 26 is placed on the line defined by the curvature of the second curvature part while being orientated toward the first vertical wall.

* * * * *